(12) United States Patent
Takeuchi

(10) Patent No.: US 7,707,402 B2
(45) Date of Patent: Apr. 27, 2010

(54) QUANTUM CIPHER COMMUNICATION SYSTEM

(75) Inventor: Shigeki Takeuchi, Sapporo (JP)

(73) Assignee: Japanese Science and Technology Corporation, Saitama (JP)

( * ) Notice: Subject to any disclaimer, the term of this patent is extended or adjusted under 35 U.S.C. 154(b) by 952 days.

(21) Appl. No.: 10/472,583

(22) PCT Filed: Mar. 20, 2002

(86) PCT No.: PCT/JP02/02672

§ 371 (c)(1),
(2), (4) Date: Feb. 17, 2004

(87) PCT Pub. No.: WO02/076016

PCT Pub. Date: Sep. 26, 2002

(65) Prior Publication Data

US 2004/0136535 A1    Jul. 15, 2004

(30) Foreign Application Priority Data

Mar. 21, 2001  (JP) .............................. 2001-081501

(51) Int. Cl.
*H04L 29/06* (2006.01)
*H04L 9/32* (2006.01)
*H04L 9/00* (2006.01)
*B41K 3/38* (2006.01)
*H04K 1/00* (2006.01)

(52) U.S. Cl. .................. 713/153; 713/160; 713/162; 713/168; 380/59; 380/256; 380/277

(58) Field of Classification Search ................ 713/153, 713/150, 160, 162, 163, 168, 170, 171; 380/59, 380/255, 256, 277, 278, 283
See application file for complete search history.

(56) References Cited

U.S. PATENT DOCUMENTS 4,897,874 A * 1/1990 Lidinsky et al. ............... 726/13

(Continued)

FOREIGN PATENT DOCUMENTS

JP          6-261073          9/1994

(Continued)

OTHER PUBLICATIONS

"Secure key distribution system based on quantum cryptography," Townsend, P.D., Electronics Letters, IEEE, vol. 30 Issue 10, May 12, 1994.*

(Continued)

*Primary Examiner*—Nasser Moazzami
*Assistant Examiner*—Oscar A Louie
(74) *Attorney, Agent, or Firm*—Wenderoth, Lind & Ponack, L.L.P.

(57) ABSTRACT

A quantum-cryptographic communication system for quantum-cryptographic communication in an optical network, including a transmitter for transmitting a packet signal having a light pulse train representing an address and a single photon pulse train for quantum cryptography, and a router including a header analyzer for extracting the address information from the light pulse train of the packet signal and a gate switch for selecting one of the optical fibers. The router routes the packet signal by selecting an optical fiber used for the next transmission path according to the extracted address information by the header analyzer and by switching the path to the selected optical fiber by the gate switch.

1 Claim, 3 Drawing Sheets

U.S. PATENT DOCUMENTS

| | | | |
|---|---|---|---|
| 5,412,720 A * | 5/1995 | Hoarty | 380/211 |
| 5,675,648 A * | 10/1997 | Townsend | 380/278 |
| 5,768,378 A * | 6/1998 | Townsend et al. | 380/256 |
| 6,522,435 B1 * | 2/2003 | Chang et al. | 398/49 |
| 6,895,091 B1 * | 5/2005 | Elliott et al. | 380/278 |

FOREIGN PATENT DOCUMENTS

WO     WO 9507582 A1 *   3/1995

OTHER PUBLICATIONS

"Quantum Privacy Amplification and the Security of Quantum Cryptography over Noisy Channels," Deutsch et al., Physical Review Letters, vol. 77 No. 13, Sep. 23, 1996.*

"An autocompensating fiber-optic quantum cryptography system based on polarization splitting of light," Bethune, D.S. et al., Quantum Electronics, IEEE Journal of, vol. 36 Issue 3, Mar. 2000.*

* cited by examiner

QUANTUM CIPHER COMMUNICATION SYSTEM

BACKGROUND OF THE INVENTION

1. Field of the Invention

This invention relates to a quantum-cryptographic communication system, or in particular to a novel quantum-cryptographic communication system which can realize a many-to-many key delivery in an optical network.

2. Description of the Related Art

In recent years, quantum cryptography has been closely watched and vigorous research and development efforts have been made to promote the quantum cryptography as the next-generation cryptographic technology which may replace the common-key DES (Data Encryption Standard) cryptography and the public-key RSA (Rivest-Shamir-Adleman) cryptography. The information communication employing this quantum cryptography makes it possible for two parties located far from each other to share a secret key without knowledge by third parties.

The quantum-cryptographic communication techniques which have so far been developed, however, are all based on the one-to-one or one-to-many key delivery using a specific fixed line. An attempt to conduct quantum-cryptographic communication in an optical network, therefore, requires the installation of an optical fiber dedicated to each user, thereby constituting an undesirable stumbling block to practical applications of the quantum-cryptographic communication on an optical network.

In order to solve this problem, a method of signal distribution through a beam splitter has been proposed (JP-A-9-502320). In this method, a multiplicity of keys are distributed from the transmitter at random to a multiplicity of users, and therefore the problem is posed that the rate at which the keys are delivered is reduced to 1/N with the increase in the number N of users.

The present invention has been achieved in view of this situation, and the object thereof is to obviate the problem of the prior art and provide a novel quantum-cryptographic communication system for realizing a many-to-many key delivery which allows a given user in an optical network to share a key with another specific user.

SUMMARY OF THE INVENTION

According to this invention, in order to solve the problem described above, there is provided a quantum-cryptographic communication system for conducting quantum-cryptographic communication in an optical network constituted by optical fibers. The quantum-cryptographic communication system includes a transmitter for transmitting a packet signal having, at least, (i) a light pulse train representing an address, and (ii) a single photon pulse train used for quantum cryptography, and a plurality of routers each including a header analyzer for extracting the address information from the light pulse train from the packet signal and a gate switch for switching to each optical fiber, wherein each router routes the packet signal by selecting an optical fiber constituting the next transmission path based on the address information detected by the header analyzer and switching the path to the selected optical fiber by the gate switch.

DETAILED DESCRIPTION OF THE INVENTION

This invention includes the above-mentioned features, and an embodiment thereof is explained below.

Figure 1:
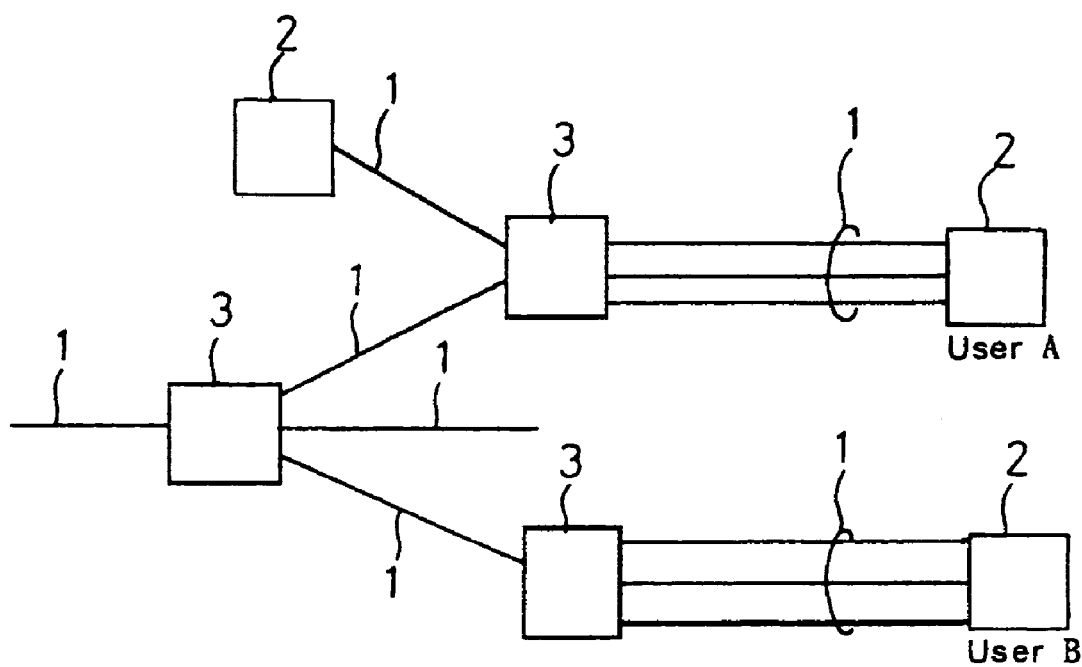
FIG. 1 is a diagram illustrating a general configuration of a quantum-cryptographic communication system according to this invention.
Figure 2:
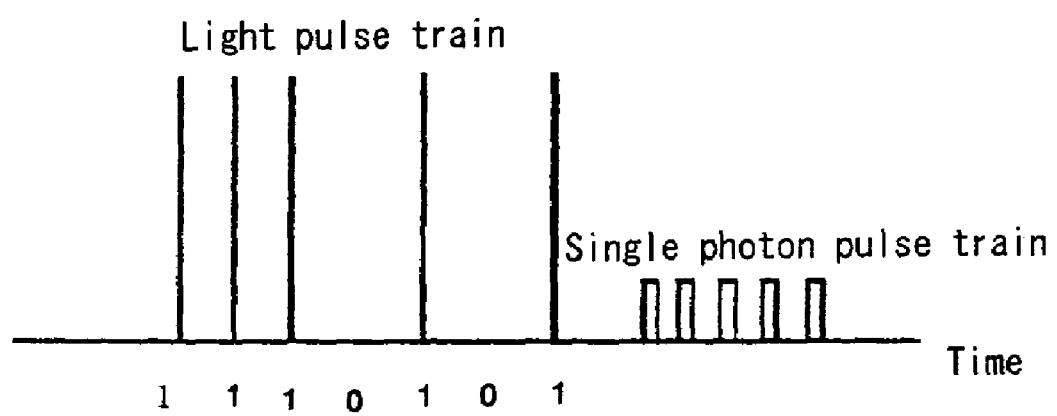
FIG. 2 is a graph illustrating a pulse signal of a quantum-cryptographic communication system according to this invention.
Figure 3:
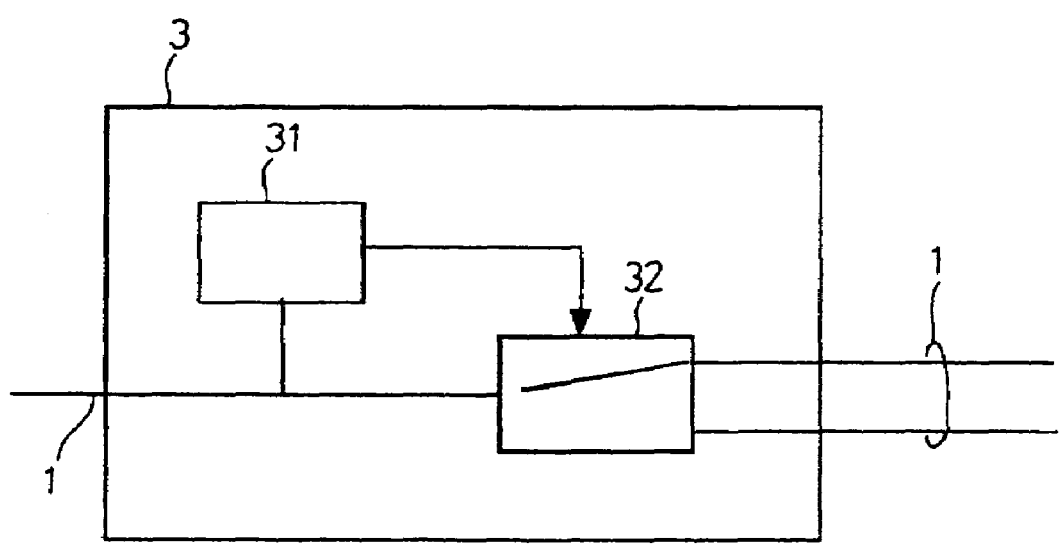
FIG. 3 is a diagram illustrating an internal configuration of a router of a quantum-cryptographic communication system according to this invention.

FIGS. 1 to 3 are diagrams for explaining a quantum-cryptographic communication system according to this invention. FIG. 1 illustrates a general configuration of a quantum-cryptographic communication system according to this invention comprising a transmitter (2) and routers (3) on an optical network constituted by optical fibers (1), FIG. 2 illustrates a pulse signal, and FIG. 3 illustrates an internal configuration of the router (3).

As illustrated in FIGS. 1 to 3, for example, this invention comprises a transmitter (2) for transmitting a packet signal having at least a light pulse train representing an address and a single photon pulse train used for the quantum cryptography, and routers (3) each including a header analyzer (31) for detecting the address information from the light pulse train of the packet signal sent by the transmitter (2) and a gate switch (32) for switching to each optical fiber (1).

Each router (3) selects an optical fiber (1) making up the next transmission path based on the address information detected by the header analyzer (31) and switches to the particular optical fiber (1) by the gate switch (32), thereby routing the packet signal. As a result, the packet signal containing a single photon pulse train is transmitted progressively to an appropriate optical fiber (1) each time it passes through a router (3).

Specifically, the quantum-cryptographic communication system according to this invention can transmit a single photon train used for the quantum cryptography to a multiplicity of users including a given user A and a specific user B in the optical network by routing according to the packet communication technique. Thus, the communication using the quantum cryptography from each home equipped with optical fibers to a base station is possible. Further, the quantum cryptography can be used for domestic applications, thereby realizing the many-to-many quantum-cryptographic communication.

The transmitter (2) includes, though not shown, a quantum cryptography means, a packet signal production means and a packet signal transmitting means. The single photon pulse train of the quantum cryptography produced by the quantum cryptography means is split into packet signals by the packet signal production means. After adding a light pulse train constituting a header representing the address of each packet signal, the particular packet signal is sent by the packet signal transmitting means to an optical fiber (1) connected thereto. A plurality of routers (3) are arranged on the optical network constituted by the optical fibers (1), so that the packet signals are routed between the routers (3).

In the packet signal illustrated in FIG. 2, the light pulse train and the single photon pulse train are temporally divided. As long as the address information can be detected by the header analyzer (31) of the router (3). However, the light pulse train and the single photon pulse train may be mixed or divided into different frequencies. The address information can be detected by the header analyzer (31) through any of the well-known various methods used for packet communication.

The light pulse train can contain not only the header representing an address (such as the destination IP address) but also a signal pulse used for normal traditional communication.

Further, the router (3) may be made up of only optical switches. In such a case, the gate switch (32) is kept open for a predetermined time length by the optical nonlinearity of the light pulse train (header portion), and while the gate switch (32) is open, the packet signal containing the single photon pulse train is transmitted to the next optical fiber (1).

This invention is not of course limited to the above-mentioned examples, but the details thereof may be variously modified.

The invention claimed is:

1. A quantum-cryptographic communication system configured to perform quantum-cryptographic communication in an optical network comprised of optical fibers, said quantum-cryptographic communication system comprising:
    a transmitter configured to produce and transmit, via an optical fiber connected thereto, a packet signal including both (i) a light pulse train constituting a header representing address information data and signal pulses used for normal communication and (ii) a single photon pulse train used in quantum cryptography, wherein the light pulse train and the single photon pulse train are divided into different frequencies, such that the light pulse train and the single photon pulse train are simultaneously transmitted together in the packet signal via the optical fiber at different frequencies to avoid interference; and
    a plurality of routers configured to determine transmission paths of the transmitted packet signal, each of said routers (i) being connected to one or more optical fibers of the optical network, (ii) including a header analyzer for detecting the address information of the light pulse train of the packet signal, and (iii) including a gate switch for switching to any of the optical fibers connected thereto,
    wherein, upon receiving the transmitted packet signal, each of said routers is configured (i) to determined a next transmission path of the packet signal according to the address information detected by said header analyzer, and (ii) to switch to an appropriate optical fiber, of the one or more optical fibers of the optical network, connected thereto using said gate switch to form the determined next transmission path for continuing a transmission of the multiplexed packet signal, such that the single photon pulses used for quantum cryptography are transmitted from a given user to a specific user.

* * * * *